（12） United States Patent
Young et al.

(10) Patent No.: US 7,308,570 B2
(45) Date of Patent: Dec. 11, 2007

(54) SYSTEM AND METHOD FOR BOOTING EMBEDDED SYSTEMS USING REMOVABLE STORAGE

(75) Inventors: Joel K. Young, Eden Prairie, MN (US); Michael L. Zarns, Plymouth, MN (US)

(73) Assignee: Digi International Inc., Minnetonka, MN (US)

( * ) Notice: Subject to any disclaimer, the term of this patent is extended or adjusted under 35 U.S.C. 154(b) by 308 days.

(21) Appl. No.: 10/969,232

(22) Filed: Oct. 20, 2004

(65) Prior Publication Data

US 2006/0085631 A1   Apr. 20, 2006

(51) Int. Cl.
*G06F 9/00* (2006.01)
*G06F 15/177* (2006.01)
*G06F 9/24* (2006.01)

(52) U.S. Cl. ............... 713/2; 713/1; 713/100; 700/104; 711/101

(58) Field of Classification Search .................... None
See application file for complete search history.

(56) References Cited

U.S. PATENT DOCUMENTS

| | | | |
|---|---|---|---|
| 6,480,146 B1 * | 11/2002 | Ferrandis et al. | 342/357.06 |
| 6,920,553 B1 * | 7/2005 | Poisner | 713/2 |
| 7,136,951 B2 * | 11/2006 | Deng et al. | 710/302 |

* cited by examiner

*Primary Examiner*—James K. Trujillo
*Assistant Examiner*—Anand B. Patel
(74) *Attorney, Agent, or Firm*—Schwegman, Lundberg & Woessner, P.A.

(57) ABSTRACT

A system and method of booting an embedded system having a processor, nonvolatile memory and a remote media interface connected to the processor. Boot code is executed within the nonvolatile memory. The processor determines if a storage device is connected to the remote media interface and, if a storage device is connected to the remote media interface, program code loaded from the storage device to the processor is executed.

18 Claims, 3 Drawing Sheets

SYSTEM AND METHOD FOR BOOTING EMBEDDED SYSTEMS USING REMOVABLE STORAGE

CROSS-REFERENCE TO RELATED APPLICATIONS

This application is related to U.S. patent application Ser. No. 10/969,231, entitled "AUTOMATIC DEVICE CONFIGURATION USING REMOVABLE STORAGE", filed on even date herewith, which is incorporated herein by reference.

BACKGROUND OF THE INVENTION

1. Field of the Invention

The present invention is related to embedded computer systems, and more particularly to a system and method for booting embedded systems using removable storage.

2. Background Information

Embedded systems range from low-end systems such as networked sensors and smart cards to high-end systems such as routers, storage servers and web servers. Embedded devices typically boot from a flash, ROM or EPROM over a serial or parallel bus interface. Typically the type of boot is configured from within the chip as part of its setup. Among other things, this boot system will usually perform initial diagnostic tests, discover and initialize the hardware system and load the application program.

Today, on an embedded system, software is typically loaded on flash memory. The flash memory is tightly coupled to the system bus. This is done because the processor only knows to get its boot information from interfaces defined within the chip. In order to get the boot code into the flash, the chip must by programmed ahead of time using a programmer or new code must be loaded using a debugger interface. The flash may also be downloaded by other code currently running, but this then requires a reboot.

To date, embedded systems have had limited access to external memory. One reason for limiting access to external memory was to reduce cost. Another reason was to limit the opportunities to compromise the embedded device. Such limits have their cost. For instance, it can be difficult to swap in a new software system on an embedded device. And it can be difficult to recover a embedded system that has been disabled by an error, or by compromised code.

What is needed is a system and method for addressing these issues and others that will become apparent in reading the following disclosure.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As noted above, in embedded systems, software is typically loaded into flash memory. The flash memory is tightly coupled to the system bus. This is done because the processor only knows to get its boot information from interfaces defined within the chip. In order to get the boot code into the flash, the chip must by programmed ahead of time using a programmer or new code must be loaded using a debugger interface. The flash may also be downloaded by other code currently running, but this then requires a reboot.

To date, embedded systems have had limited access to external memory. As noted above, one reason for limiting access to external memory was to reduce cost. Another reason was to limit the opportunities to compromise the embedded device. As noted above, it can be difficult in such systems to swap in a new software system on an embedded device. And it can be difficult to recover a embedded system that has been disabled by an error, or by compromised code.

Figure 1:
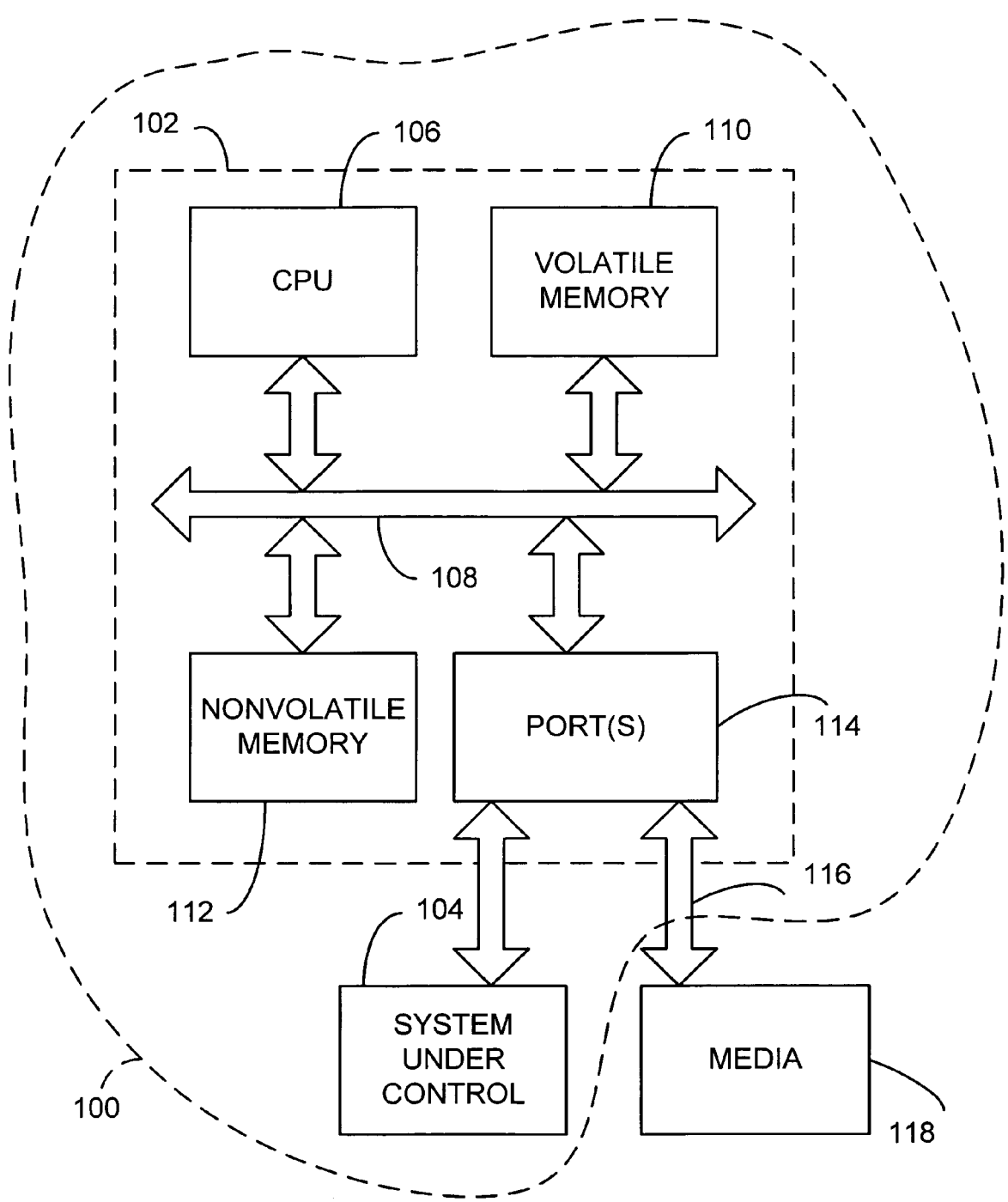
FIG. 1 illustrates an embedded system according to the present invention.

An embedded system 100 which mitigates the above problems is shown in FIG. 1. In embedded system 100, a microcontroller 102 is connected to a system 104 which is being monitored or controlled. Microcontroller 102 includes a CPU 106 connected across a bus 108 to volatile memory 110, nonvolatile memory 112 and port(s) 114. Ports 114 include a removable media interface 116.

In today's world, flash storage is available with a CF (Compact Flash) and USB interface. These are used today for additional storage after the embedded operating system and application is up and running. System 100 combines the notions of removable flash storage and boot such that a system boot can be supported and managed from a remote storage device (USB, CF, etc.). In this way, the software system, including the operating system, can be configured, changed and modified using interchangeable and easily removable hardware components.

Figure 2:
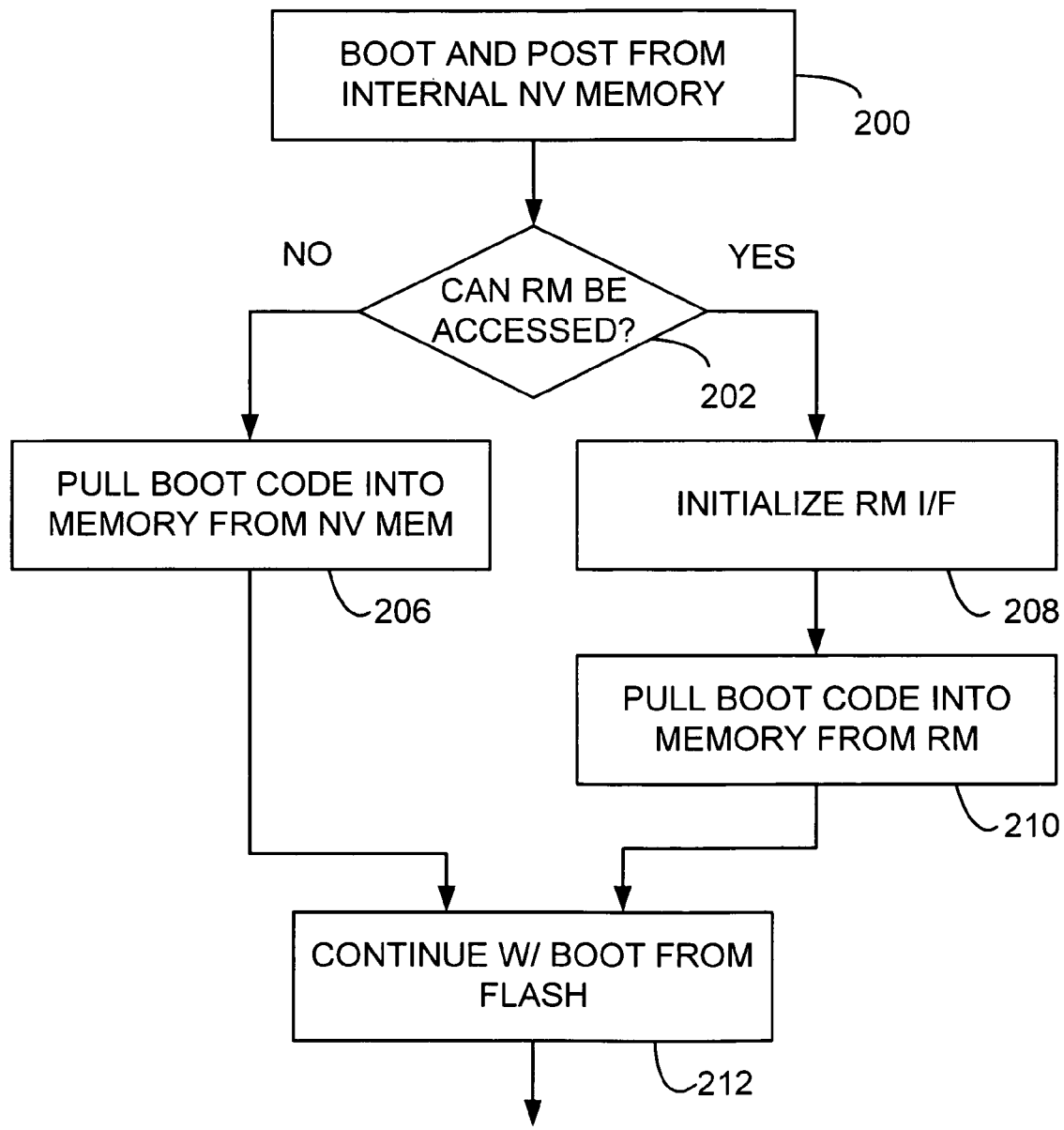
FIG. 2 illustrates a thin loading routine according to the present invention.

In one embodiment, system 100 includes a thin loading routine. The thin loading routine is either stored in processor 102 itself or in off-board ROM (not shown). One such embodiment is shown in FIG. 2. In the embodiment shown in FIG. 2, processor 102 performs an initial boot and Power-On Self Test (POST) routine from nonvolatile memory 112. Processor 102 then attempts at 202 to access removable media 118 over interface 116. In one such embodiment, the thin loading routine triggers a device specific access and copy of information though the removable storage interface (USB or CF). This is similar to the sort of procedure that a PC goes though when booting from an IDE based hard disk or CD ROM.

If processor 102 can access removable media across removable media interface 116, control moves to 208 and processor 102 installs a micro USB host interface driver (or equivalent for Compact Flash or other serial based flash storage) and storage interface driver within the POST utility such that the USB attached storage can be used as a bootable image. Control then moves to 210, where boot code is loaded from removable media 118. Control then moves to 212 where the boot code is executed from memory 110 or 112.

In one embodiment, unlike traditional storage drivers, the micro USB host interface does not load the complete USB stack and all plug and play utilities. Instead, it tries a fixed combination at a specific memory location in looking for the boot record. Such an embodiment does not attempt to be a general purpose storage interface, but instead is a specific, hardwired media interface masquerading as a general purpose interface.

In one embodiment, in order to keep it simple, removable storage 118 is used for booting a troubled device only. In order to write a new software image into flash, other flash update procedures need to be followed. The added benefit is that it prevents a boot code in the onboard flash from being overwritten without specific follow-up.

In one embodiment, system 102 boots from removable storage 118 but does not write the image to permanent memory 112. Such an approach provides a certain level of security and profiling. For example, each employee could carry a boot stick 118. Boot stick 118 would include a profile specific to each employee that identified the units used by that employee.

If employees want to make something permanent in flash, they would then use an existing firmware download utility, included in the boot image to do this. This would allow selected employees to modify the units while restricting the ability of others to make such modifications. That is, the individual boot image can be configured to allow one user the ability and another one not the ability.

In one such embodiment, media 118 includes permissions that enable some boot images to automatically commit the image to onboard flash while restricting others. In one embodiment, this is done by automatically launching the firmware upgrade application as part of the boot process. A representative process is shown in FIG. 3.

Interestingly enough, because this would be a new process, the actual new image being loaded into flash could and would actually be different than that actual boot code.

Figure 3:
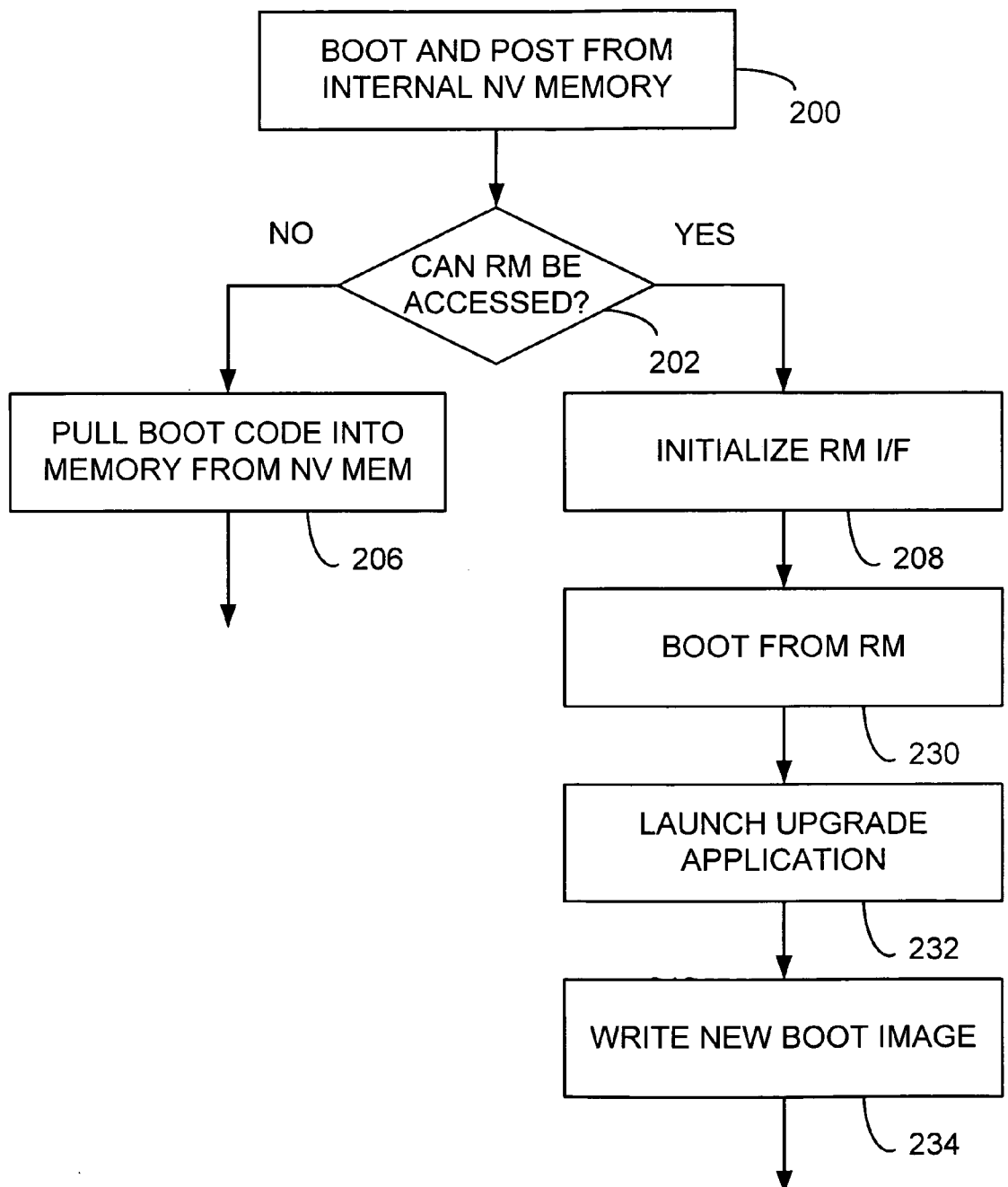
FIG. 3 illustrates a method for installing firmware according to the present invention.

In the embodiment shown in FIG. 3, processor 102 performs an initial boot and POST routine from nonvolatile memory 112. Processor 102 then attempts at 202 to access removable media 118 over interface 116. In one such embodiment, the thin loading routine triggers a device specific access and copy of information through the removable storage interface (USB or CF). Once again, this is similar to the sort of procedure that a PC goes through when booting from an IDE based hard disk or CD ROM.

If processor 102 can access removable media across removable media interface 116, control moves to 208 and processor 102 installs a micro USB host interface driver (or equivalent for Compact Flash or other serial based flash storage) and storage interface driver within the POST utility such that the USB attached storage can be used as a bootable image. Control then moves to 230, where processor 102 boots from media 118. Control then moves to 232, where processor 102 launches a firmware upgrade application stored within memory 110 or 112 or from removable media 118. Control then moves to 234 where the firmware upgrade application downloads a new boot image file from media 118 and writes it to nonvolatile memory 112. The next time the system is powered-up or re-booted, assuming the removable storage is gone, the system would boot from the new image committed to flash.

An advantage of this approach is that the application which boots from removable storage can be the fully fledged normal application that would normally boot from flash, OR it can be a custom special purpose application for a new flash image, an application tailored for a specific person or purpose.

In one embodiment, each media 118 includes security measures to prevent someone from coming up and loading malicious code. In one such embodiment, an authentication code is placed in a locked portion of onboard flash or EEprom on the unit. As part of the micro boot process, the authentication code would be exclusively OR'd (or otherwise compared) to the authentication code on the removable storage 118 used for boot. If the match fails, then the system boots normally from the onboard flash (or fails if there is no image). As an extension, in one embodiment the authorization code is concatenated with the unit's Ethernet MAC address, thereby giving each unit its own individual identity.

As noted above, on embedded systems to date, software is loaded on flash memory which is tightly coupled to the system bus. This is done because the processor only knows to get its boot information from interfaces defined within the chip. However, in order to get the boot code into the flash, the chip must by programmed ahead of time using a programmer or new code must be loaded using a debugger interface. The flash may also be downloaded by other code currently running, but this then requires a reboot.

The embedded system described above makes it easy to swap software systems on embedded products, provides an easy, secure mechanism for transfer software and secure environments, lowers the cost of a device by not requiring large amounts of local flash memory storage and provides a safe and easy method for recovering a errored system without the use of external tools, terminal software, or debugger.

There are several key differences between the approach described above and the approach used, for instance, on a personal computer. These differences relate to the fact that we are using an embedded solution which may not have any sort of user interaction or feedback.

When a PC boots from a hard disk, it automatically queries the interface. If there is no response for a boot record, it fails. It does not authenticate the boot record to match the device, it does not check to see if it is valid—it just tries to load it. Of course, the typical PC also enables the configuration of a boot order for a floppy disk or ATAPI CD ROM. In these cases it asks for a boot record, if one does not exist, it then tries the next choice. Hence a PC might first try the floppy, then try the CD and finally to the Hard disk. However, in no time is the record ever validated as being valid in the context of the individual machine. Hence, one it tries to load, if it fails, then the user is informed on the screen and the machine may be powered off and on to try again.

In the embedded world, we don't have this luxury. Hence, the biggest difference is that we MUST authenticate the record to determine if the boot is applicable for the type of embedded device. This is prior to doing any of the aforementioned security options. If it is not valid, we must default to booting from the onboard Flash (if present). Secondly, the micro boot on the system loads an abbreviated version of the device driver which directly couples the removable storage to the unit—the code is loaded into memory and then the interface effectively goes away. This prevents corruption if someone then decides to remove the removable storage.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. An embedded computer system, comprising:
    a system and a microcontroller coupled to the system and configured to control the system, the micro controller including:
    a processor;
    a system interface configured to connect the system to the processor; and
    a remote media interface connected to the processor and adapted to receive a removable storage device having a boot code corresponding to the embedded computer system, the remote media interface configured to provide the boot code to the processor when the removable storage device is connected to the remote media interface; and
    wherein the processor includes an internal nonvolatile memory and means for loading and executing the boot code through the remote media interface, wherein the means for loading includes a micro universal serial bus (USB) host interface driver and a storage interface driver.

2. The embedded computer system according to claim 1, wherein the remote media interface is a USB interface.

3. The embedded computer system according to claim 1, wherein the micro universal serial bus (USB) host interface driver and the storage interface driver are installed within a Power-On Self Test routine.

4. The embedded computer system according to claim 1, where the boot code is configured to boot and recover a troubled embedded system that failed during a prior boot operation performed using program code in the internal nonvolatile memory.

5. The embedded computer system according to claim 1, wherein the remote media interface is adapted to receive a boot code that corresponds to a specific user of the embedded system.

6. An embedded computer system, comprising: a system and a microcontroller coupled to the system and configured to control the system, the micro controller including:
    a processor;
    a system interface configured to connect the system to the processor; and
    a remote media interface connected to the processor and adapted to receive a removable storage device having a boot code corresponding to the embedded computer system, the remote media interface configured to provide the boot code to the processor when the removable storage device is connected to the remote media interface; and
    wherein the processor includes an internal nonvolatile memory and means for loading and executing the boot code through the remote media interface and the processor configured to install a micro universal serial bus (USB) host interface driver and a storage interface driver, and wherein the remote media interface includes a compact flash (CF) interface.

7. A method of booting an embedded system having a microcontroller including a processor, an internal nonvolatile memory and a remote media interface connected to the processor, the method comprising:
    executing an initial boot code provided within the internal nonvolatile memory;
    determining if a removable storage device having a boot imagine corresponding to the embedded computer system is connected to the remote media interface after executing the initial boot code provided within the internal nonvolatile memory;
    if a removable storage device having a boot image corresponding to the embedded computer system is connected to the remote media interface, executing a program code of the boot image loaded from the removable storage device to the processor, wherein executing the program code loaded from the storage device to the processor includes:
        executing the program code for accessing the removable storage device;
        loading program code from the removable storage device to the processor; and
        executing the program code loaded from the removable storage device to the processor.

8. The method according to claim 7, wherein the method further comprises, executing initial boot code from internal nonvolatile memory if the removable storage device is not connected to the remote media interface.

9. The method according to claim 8, the method further comprises, executing a Power-On Self Test (POST) routine provided in the internal nonvolatile memory if the removable storage device is not connected to the remote media interface.

10. An article comprising a computer readable medium having instructions thereon, wherein the instructions, when executed in a computer, create a system for executing the method of claim 7.

11. The method according to claim 7, the method further comprises, executing a Power-On Self Test (POST) routine provided in the removable storage device if the removable storage device is connected to the remote media interface.

12. The method according to claim 11, the method further comprises, installing a micro universal serial bus (USB) host interface driver and a storage interface driver within the Power-On Self Test routine.

13. The method according to claim 12, wherein installing the micro universal serial bus (USB) host interface driver includes installing less than a complete USB stack.

14. The method according to claim 7, wherein executing the program code includes executing a bootable image for the embedded system.

15. The method according to claim 7, wherein executing the program code includes executing the program code without writing into the internal nonvolatile memory.

16. The method according to claim 15, wherein executing the program code includes executing a boot operation to boot and recover a troubled embedded system.

17. The method according to claim 7, further comprises, downloading a firmware upgrade application from the removable storage device to the internal nonvolatile memory.

18. The method according to claim 7, further comprises, authenticating the application in the removable storage device by validating an authentication code stored in the removable storage device with a similar authentication code stored in the internal nonvolatile memory.

* * * * *

UNITED STATES PATENT AND TRADEMARK OFFICE
CERTIFICATE OF CORRECTION

PATENT NO. : 7,308,570 B2 Page 1 of 1
APPLICATION NO. : 10/969232
DATED : December 11, 2007
INVENTOR(S) : Young et al.

It is certified that error appears in the above-identified patent and that said Letters Patent is hereby corrected as shown below:

In column 1, line 45, delete "a" and insert -- an --, therefor.

In column 2, line 18, delete "a" and insert -- an --, therefor.

In column 2, line 46, delete "though" and insert -- through --, therefor.

In column 2, line 48, delete "though" and insert -- through --, therefor.

In column 3, line 65, delete "EEprom" and insert -- EEPROM --, therefor.

In column 4, line 20, delete "a" and insert -- an --, therefor.

In column 6, line 22, in Claim 7, delete "imagine" and insert -- image --, therefor.

Signed and Sealed this

Third Day of June, 2008

JON W. DUDAS
*Director of the United States Patent and Trademark Office*